E. C. SENDELBACH.
VEHICLE WHEEL.
APPLICATION FILED JULY 19, 1913.
1,095,678.
Patented May 5, 1914.
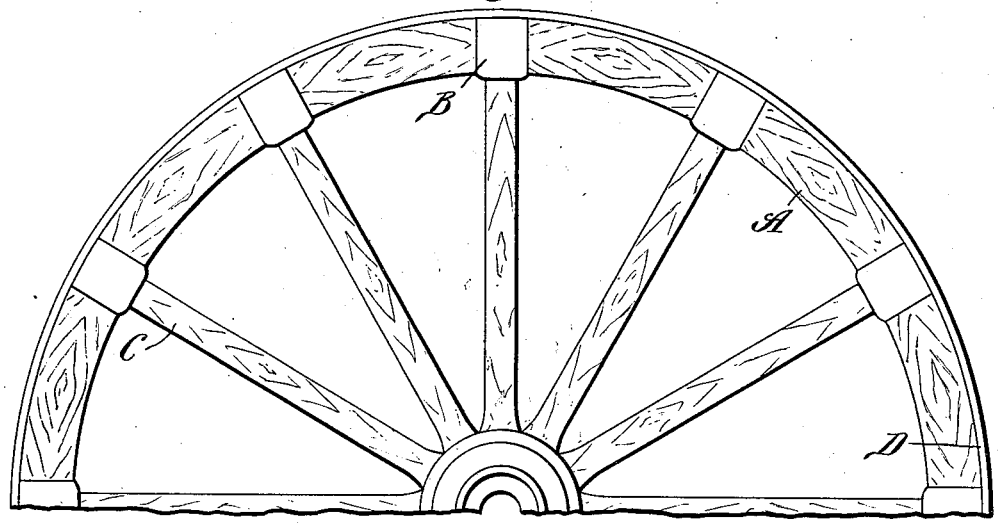
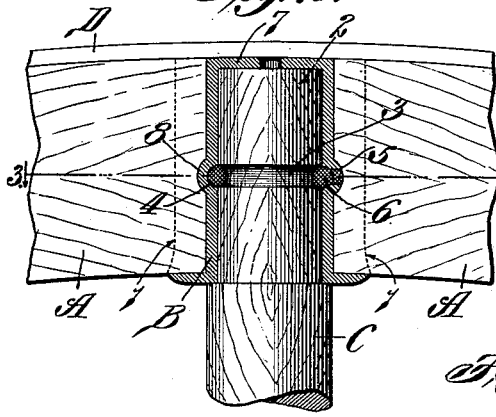
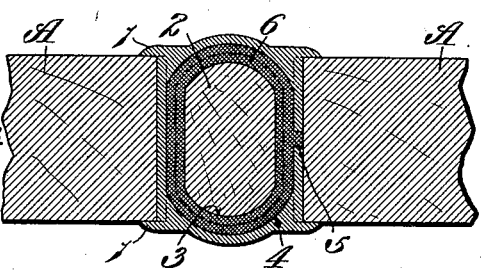
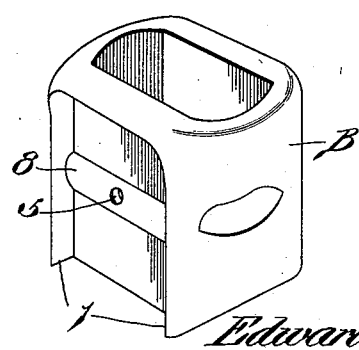

UNITED STATES PATENT OFFICE.

EDWARD C. SENDELBACH, OF PIQUA, OHIO.

VEHICLE-WHEEL.

1,095,678.  Specification of Letters Patent.  Patented May 5, 1914.

Application filed July 19, 1913. Serial No. 779,888.

*To all whom it may concern:*

Be it known that I, EDWARD C. SENDELBACH, a citizen of the United States, residing at Piqua, Ohio, have invented a certain new and useful Improvement in Vehicle-Wheels, of which the following is a full, clear, and exact description, such as will enable others skilled in the art to which it appertains to make and use the same.

This invention relates to wooden vehicle wheels of the type in which the felly proper or rim of the wheel is made up of a number of short segmental-shaped wooden sections that are arranged between castings mounted on the ends of the wooden spokes of the wheel.

One object of my invention is to provide a wheel of the character mentioned in which the castings on the ends of the spokes are connected to the spokes in a novel manner that prevents them from rising or moving longitudinally of the spokes when the spokes get wet and "swell," or during the operation of rimming up or keying up the felly sections.

Another object is to provide a wheel of the character described in which the castings that coöperate with the felly sections are securely connected to the spokes without the aid of nails, screws or other fastening devices that would form holes in the spokes in which water could collect and thus cause the spokes to rot or decay.

Other objects and desirable features of my invention will be hereinafter pointed out.

Figure 1 of the drawings is a side elevational view of one-half of a vehicle wheel constructed in accordance with my invention; Fig. 2 is an enlarged detail view showing one of the castings in vertical section; Fig. 3 is a horizontal sectional view taken on the line 3—3 of Fig. 2; and Fig. 4 is a perspective view of one of the castings that are mounted on the ends of the spokes.

Referring to the drawings which illustrate the preferred form of my invention, A designates a plurality of segmental-shaped felly wooden sections that are arranged between castings B mounted on the ends of the wooden spokes C of the wheel so as to form the felly or rim of the wheel, and D designates a tire or tread that surrounds the felly. The ends of the felly sections A are seated in substantially U-shaped or channel-shaped flanges 1 on the castings B, and the spokes C are preferably provided at their outer ends with tenons 2 that fit snugly in said castings, as shown in Figs. 2 and 3. The tenons 2 have flat sides or are non-circular shape in cross section, as shown in Fig. 3, so that the castings B cannot turn or rotate on the spokes, and said castings are connected to the spokes in such a manner that they cannot move longitudinally of the spokes. As shown in Fig. 2 the tenon 2, of each spoke or the outer end of the spoke which projects into the casting is provided with a horizontally disposed groove 3 that extends around the tenon or outer end portion of the spoke, and a coöperating horizontally disposed groove 4 is formed on the inner side of the socket in the casting that receives the spoke. After the casting has been arranged in operative position on the spoke, cast metal is poured through an opening 5 in the casting so as to fill the coöperating grooves 3 and 4 and thus form a locking ring or retaining member 6 that securely fastens the casting to the spoke and prevents the casting from moving longitudinally of the spoke. The particular cross sectional shape of the coöperating grooves in the castings and in the spokes is immaterial and it is also immaterial whether said grooves extend clear around the spokes or only partly around the spokes as my broad idea consists in a wheel of the character mentioned in which the members that retain the felly sections in position are locked to the spokes by means of metal which is poured into coöperating grooves, recesses or openings in the spokes and in the said members when said metal is in a molten state. Each casting B is preferably provided with an end wall 7 that bears against the end of the spoke which projects into the casting, and the flat side walls of the castings against which the ends of the felly sections bear, are preferably curved outwardly at the points where the grooves 4 are formed inside of same so that said walls will be of uniform thickness and also be provided with ribs 8 that tend to prevent the felly sections A from moving outwardly.

In a wheel of the construction above-described there is no liability of the castings rising or moving longitudinally of the spokes when the spokes get wet and swell or during the operation of rimming or keying up the felly sections owing to the fact that each casting is securely locked to its coöperating spoke in such a manner that it cannot move longitudinally of same. Furthermore, there is no tendency for the wooden spokes to rot or decay as might occur if screws, nails or similar fastening devices were driven into the spokes to connect the castings to same because the means which retains the castings in position consist of cast metal devices that are molded in coöperating spaces in the castings and in the spokes and completely concealed by the castings.

A wooden vehicle wheel of the character mentioned can be manufactured at a low cost and it is stronger and more serviceable than the wheels of this type which have heretofore been devised owing to the novel way in which the castings are connected to the spokes.

Having thus described my invention, what I claim as new and desire to secure by Letters Patent is:

1. A vehicle wheel comprising spokes, a felly proper or rim composed of a plurality of segmental-shaped sections, metallic devices on the spokes which receive the ends of said felly sections and retain them in position, said devices fitting the spokes snugly, and means for locking said devices to the spokes so as to prevent said devices from moving longitudinally of the spokes, said locking means consisting of metal that is poured in a molten state into coöperating spaces in said spokes and in the inner faces of the walls of said devices that embrace the spokes.

2. A vehicle wheel comprising spokes, a felly proper composed of a plurality of segmental-shaped sections, devices on the spokes which receive the ends of said felly sections and thus serve to connect the spokes and the felly of the wheel together, and cast metal retaining members completely concealed by said devices and operating to prevent said devices from moving longitudinally of the spokes.

3. A vehicle wheel comprising spokes, a felly for the wheel composed of a plurality of segmental-shaped sections, devices on the spokes which receive the ends of said felly sections and retain them in position, said devices having grooves on the inner sides of same that coöperate with grooves in the spokes, molded locking members formed from metal that is poured into the coöperating grooves in said devices and spokes when it is in a molten condition, and projections on said devices that fit in recesses in the ends of said felly sections.

4. A vehicle wheel comprising spokes, a felly composed of a plurality of segmental-shaped sections, devices on the spokes which receive the ends of said felly sections and retain them in position, coöperating horizontally disposed grooves extending around the inner sides of the openings in said devices in which the spokes fit and around the portions of the spokes that fit in said devices, and means for locking said devices to said spokes consisting of metal that is poured into the coöperating grooves in said devices and spokes through openings in said devices.

5. A vehicle wheel comprising spokes, a felly for the wheel composed of a plurality of segmental-shaped sections, castings fitting snugly on the ends of the spokes and provided with flanges that receive the ends of said felly sections and retain them in position, each of said castings having a horizontally disposed groove extending around the inside of same, a coöperating groove formed in the portion of the spoke that projects into the casing, a retaining means for each of said castings consisting of metal that is poured into the coöperating groove on the inside of the casting and in the spoke and devices on said castings that project into recesses in the ends of said felly sections so as to prevent said sections from moving outwardly.

6. A vehicle wheel comprising spokes provided at their outer ends with tenons that are non-circular-shaped in cross section, a felly for the wheel composed of a plurality of segmental-shaped sections, castings having sockets for receiving the tenons on said spokes and provided with means for holding said felly sections in position, a cast metal means arranged inside of the sockets in said castings for securely locking same to the tenons of the spokes, and transverse ribs on the outside of said castings that fit in transverse recesses in the ends of said felly sections.

In testimony whereof I hereunto affix my signature in the presence of two witnesses, this 10th day of July 1913.

EDWARD C. SENDELBACH.

Witnesses:
HARRY C. WHITNEY,
CARL M. BAYMAN.

---

Copies of this patent may be obtained for five cents each, by addressing the "Commissioner of Patents, Washington, D. C."